US005607778A

United States Patent [19]
Padden

[11] Patent Number: 5,607,778
[45] Date of Patent: Mar. 4, 1997

[54] METHOD OF MANUFACTURING A POROUS METAL MAT

[75] Inventor: James B. Padden, Kernersville, N.C.

[73] Assignee: Purolator Products Company, Tulsa, Okla.

[21] Appl. No.: 504,613

[22] Filed: Jul. 20, 1995

[51] Int. Cl.⁶ .......................... B32B 3/24; B23K 101/22
[52] U.S. Cl. ........................................... 428/613; 228/190
[58] Field of Search ..................... 428/596, 613, 428/636; 228/190; 204/284

[56] References Cited

U.S. PATENT DOCUMENTS

| 1,626,774 | 5/1927 | Allan | 204/284 |
|---|---|---|---|
| 2,256,000 | 9/1941 | McNeil | 228/190 |
| 2,275,194 | 3/1942 | Sizelove | 204/284 |
| 3,630,312 | 12/1971 | Woodward | 181/33 |
| 3,671,415 | 6/1972 | King et al. | 204/284 |
| 3,676,315 | 7/1972 | Goens et al. | 204/284 |
| 3,944,505 | 3/1976 | LaCroix | 252/466 B |
| 4,044,218 | 8/1977 | Olson et al. | 219/91 |
| 4,359,181 | 11/1982 | Chisholm | 228/183 |
| 4,401,530 | 8/1983 | Clere | 204/98 |
| 4,460,441 | 7/1984 | Domning | 204/284 |
| 4,605,487 | 8/1986 | Shiragami et al. | 204/258 |
| 5,041,196 | 8/1991 | Cawlfield et al. | 204/101 |
| 5,137,607 | 8/1992 | Anderson et al. | 204/59 |
| 5,137,634 | 8/1992 | Butler et al. | 210/490 |
| 5,215,943 | 6/1993 | Anderson et al. | 501/12 |
| 5,227,342 | 7/1993 | Anderson et al. | 501/12 |
| 5,230,780 | 7/1993 | Carlson et al. | 204/98 |
| 5,308,454 | 5/1994 | Anderson | 204/59 |
| 5,340,455 | 8/1994 | Kroon et al. | 204/196 |

Primary Examiner—John Zimmerman
Attorney, Agent, or Firm—Joseph V. Tassone

[57] ABSTRACT

Multiple layers of expanded electrically conductive metal foil are stacked, some of the layers are expanded and some are flattened. After the stack of layers is formed, it is compressed and the layers are bonded together to form a semi-rigid electrically conductive porous metal mat.

18 Claims, 3 Drawing Sheets

METHOD OF MANUFACTURING A POROUS METAL MAT

CROSS-REFERENCE TO PENDING APPLICATIONS

This application is not related to any pending United States or foreign patent application.

CROSS-REFERENCE TO MICROFICHE APPENDIX

This application is not related to any microfiche appendix.

BRIEF SUMMARY OF THE INVENTION

A method of manufacturing a porous metal mat is described. The method includes forming, in overlapping relationship, a multi-layer stack of expanded electrically conductive metal foil in which some of the layers of foil are as expanded and others of the layers are flattened after being expanded, to provide a stacked assembly. The stacked assembly is then compressed and bonded to form a semi-rigid electrically conductive mat.

Expanded metal foil is formed from a unitary thin, flat foil sheet. Slits are cut in the sheet and the foil is stretched, that is, "expanded". The typical expanded metal foil has diamond-shaped openings as a result of the expansion. The expanded foil is in the form of connected filaments outlining the diamond-shaped openings.

When foil is expanded it typically has an uncompressed thickness that is greater than the foil itself. That is, in the expansion process, typically the metal strands forming the expanded foil are tilted slightly relative to the plane of the foil so that the expanded metal foil is somewhat thicker than the flat foil of which the expanded foil is manufactured.

To manufacturer a porous metal mat according to the present invention, some of the expanded metal foils (such as 50%) are flattened by a press or by passing them between rollers to return the expanded metal foil to approximately the same thickness of the foil prior to expansion. In the preferred arrangement, a mat is manufactured by stacking the expanded metal foils in alternate layers, that is, in which a first layer is of the foil as expanded that has a thickness slightly greater than the normal foil thickness caused as a result of the expansion followed by a layer of expanded metal foil that has been flattened, and the sequence repeated until the desired thickness of the mat is achieved.

In the preferred arrangement, the expanded metal foils are stacked in a way to avoid alignment of the openings therethrough so as to provide, in the mat as completed, a high degree of porosity with a minimum of direct flow paths from one mat surface to the other.

After stacking, the assembly is compressed and bonded to form an integral semi-rigid electrically conductive mat. Bonding can be mechanical, such as by stapling or riveting. Bonding can also be achieved by the use of heat, such as by welding or brazing. A third and a preferred method is diffusion bonding—a process well known in industry that integrally electrically and mechanically secures the adjacent sheets to each other, but in a way to preserve the porosity of the stacked assembly.

Prior art examples of processes that employ electrically conductive porous metal mats are illustrated and described in the following United States Patents:

| Pat. No. | TITLE |
|---|---|
| 5,041,196 | Electrochemical Method For Producing Chlorine Dioxide Solutions |
| 5,137,607 | Reactor Vessel Using Metal Oxide Ceramic Membranes |
| 5,230,780 | Electrolyzing Halogen-Containing Solution In A Membrane Cell |
| 5,308,454 | Reactor Process Using Metal Oxide Ceramic Membranes |
| 5,340,455 | Cathodic Protection System For Above-Ground Storage Tank Bottoms and Method Of Installing |

Of these references, U.S. Pat. No. 5,041,196 is the best example of the use of a porous electrically conductive metal mat.

Others have suggested methods of producing porous materials as found in the following United States Patents:

| Pat. No. | TITLE |
|---|---|
| 5,137,634 | Composite Membranes |
| 5,215,943 | Ceramic Membranes With Enhanced Thermal Stability |
| 5,227,342 | Process Of Making Porous Ceramic Materials With Controlled Porosity |

A standard technique for making a porous metal mat is to employ filaments, that is, small diameter wires or fibers that are assembled and pressed together into a uniform thick mat in which the loose filaments are bonded together. While this type of mat works very successfully in various chemical processes, including electrolytic processes, nevertheless, such porous metal fibrous mats are difficult to make and therefore expensive. The present invention provides a way of making a porous metal mat employing expanded metal foil that produces a mat having the porosity and other features similar to a fibrous mat but wherein the costs of production of the mat are substantially less than that of a fibrous mat.

A better understanding of the invention will be obtained from the following description of the preferred embodiments, taken in conjunction with the attached drawings.

BRIEF DESCRIPTION OF THE DRAWINGS

FIG. 6 is a pictorial representation of a finished mat in which the stack has been compressed and bonded into a semi-rigid electrically conductive mat. The thickness of the mat is determined by the number of layers of expanded metal foil employed and the amount of compression applied to the assembly. The layers of the porous metal electrical mat of FIG. 6 are bonded to each other either mechanically such as by stapling or riveting, by heat, such as by welding or brazing, or preferably by diffusion bonding.

DETAILED DESCRIPTION OF THE PREFERRED EMBODIMENTS

Figure 1:
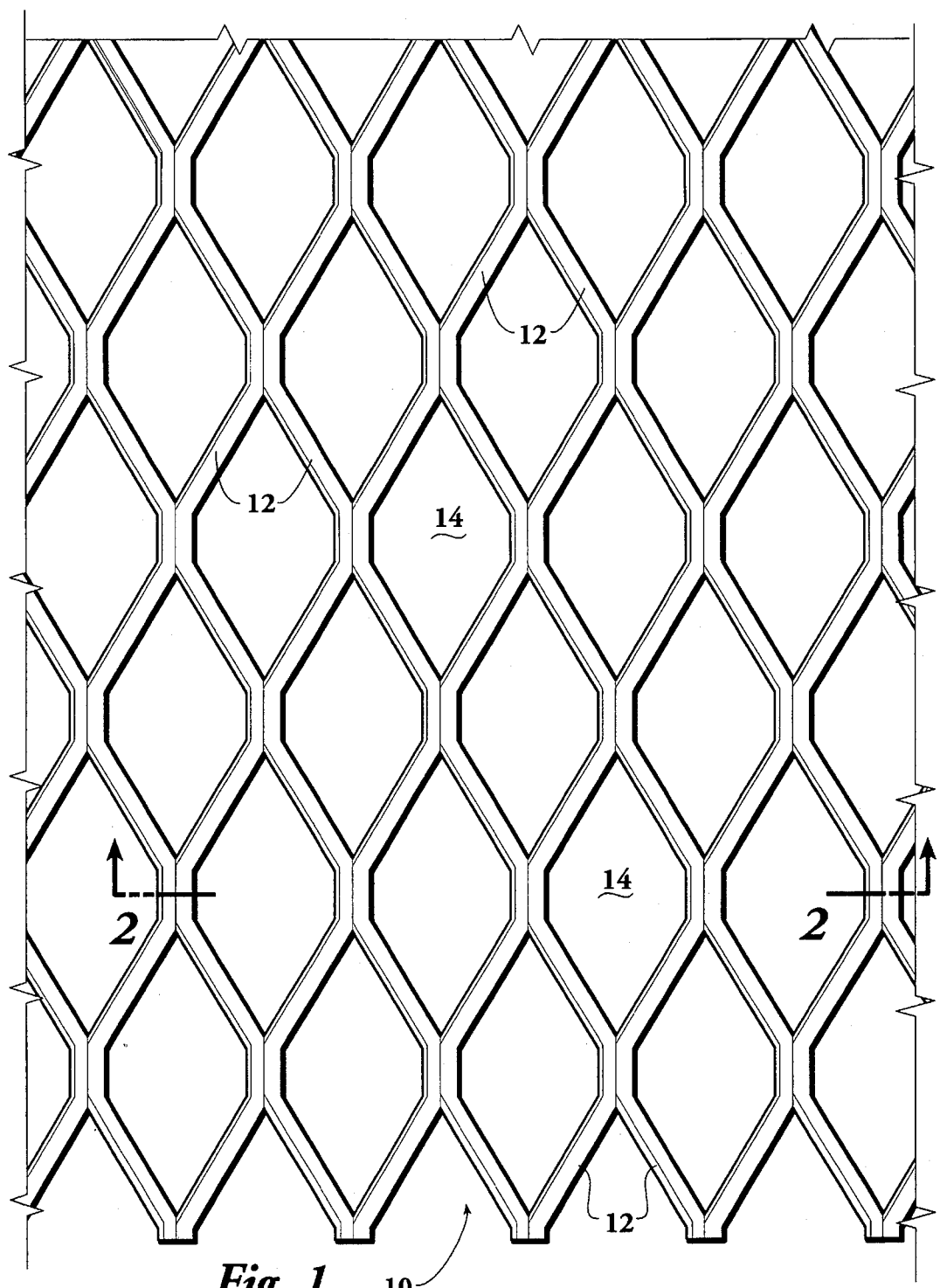
FIG. 1 is a plan view of a typical expanded metal foil.
Figure 2:
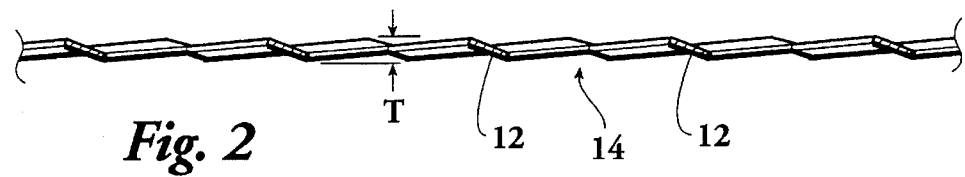
FIG. 2 is a cross-sectional view as taken along the line 2—2 of FIG. 1 showing a typical cross-sectional configuration of an expanded metal foil and showing that the thickness of the uncompressed expanded metal foil is greater than the thickness of the foil itself.

FIG. 1 is a plan view, and FIG. 2 is a cross-sectional view of a typical expanded metal foil. Expanded metal is well known in industry. A thin sheet or foil of metal is perforated with slits and then stretched to "expand" the foil. Expansion greatly increases the area of the original foil sheet and is characterized by diamond-shaped openings formed in the foil. In FIG. 1 the expanded foil is generally indicated by the numeral 10 and is formed by continuous filaments 12 that make up the foil after expansion, the filaments being separated by diamond-shaped openings 14.

FIG. 2 is a cross-sectional view of a portion of the expanded metal foil as taken along the line 2—2 of FIG. 1. In the normal procedure of expanding metal foil the result is a foil having a thickness "T" that is greater than the nominal thickness of metal foil before it is expanded.

Figure 3:
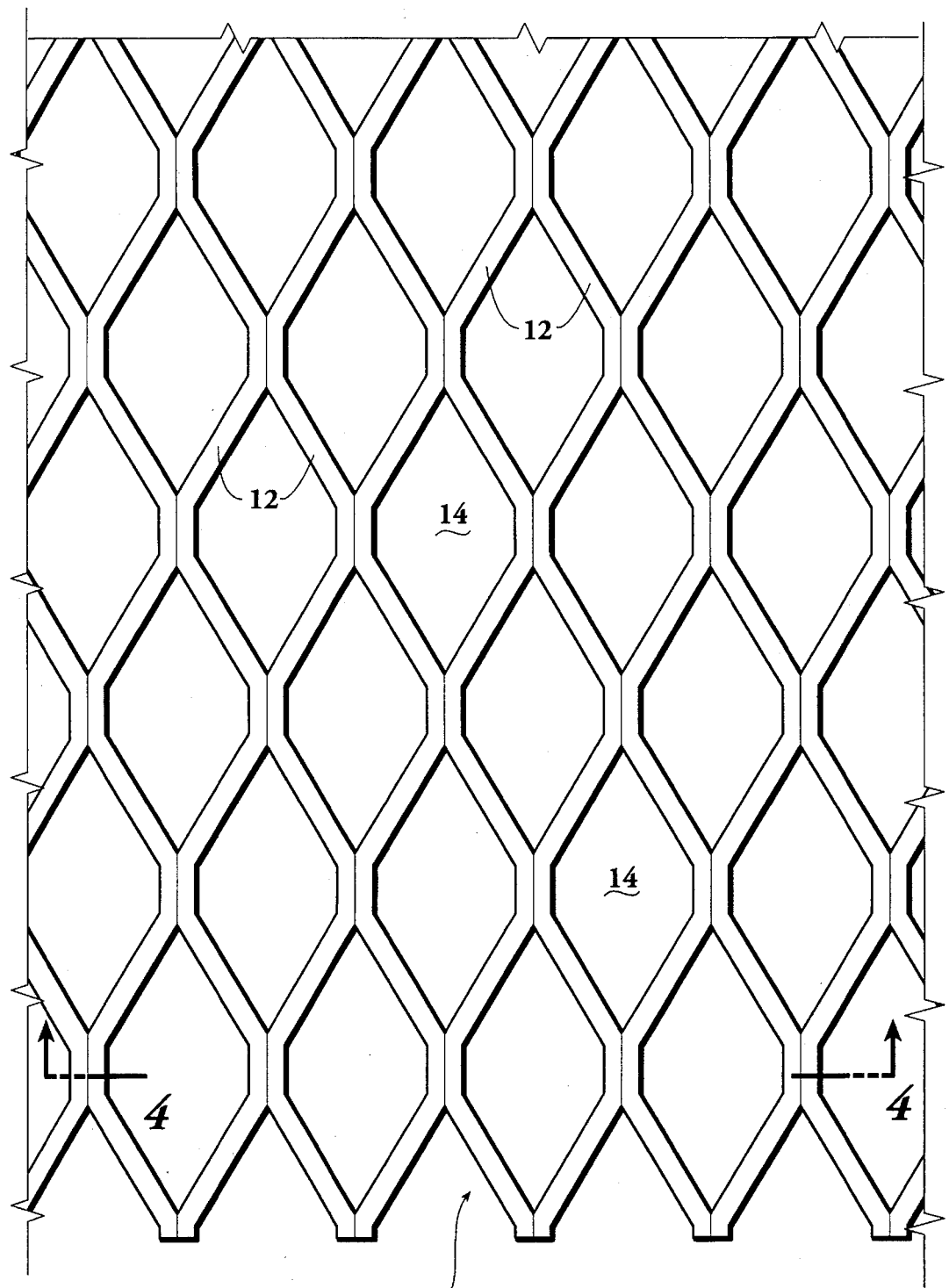
FIG. 3 is a plan view of a flattened expanded metal foil, that is, a foil that, after having been expanded, is flattened such as by a press or by passing it through rollers to return the thickness of the flattened metal foil to approximately that of the normal thickness of the foil prior to expansion.
Figure 4:
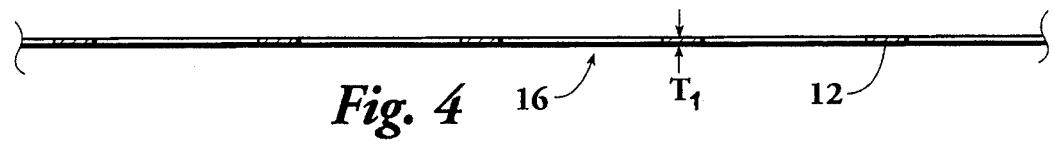
FIG. 4 is a cross-sectional view as taken along the line 4—4 of FIG. 3 showing a flattened expanded metal foil.

FIG. 3 shows a plan view of a metal foil of the type shown in FIG. 1 but in which the foil is flattened. The flattened expanded metal foil is indicated by numeral 16. It retains the strands or filament 12 and the openings 14 but, as shown in the cross-sectional view of FIG. 4, the flattened foil has a thickness "$T_1$" that is approximately the nominal thickness of the foil prior to expansion. The thickness "$T_1$" is less than the thickness "T" as seen in FIG. 2. The flattened metal foil 16 as shown in FIGS. 3 and 4 can be obtained by subjecting the expanded metal foil of FIG. 1 to a press or by passing the expanded metal foil through rollers to flatten the foil so that it appears as in FIGS. 3 and 4.

Figure 5:
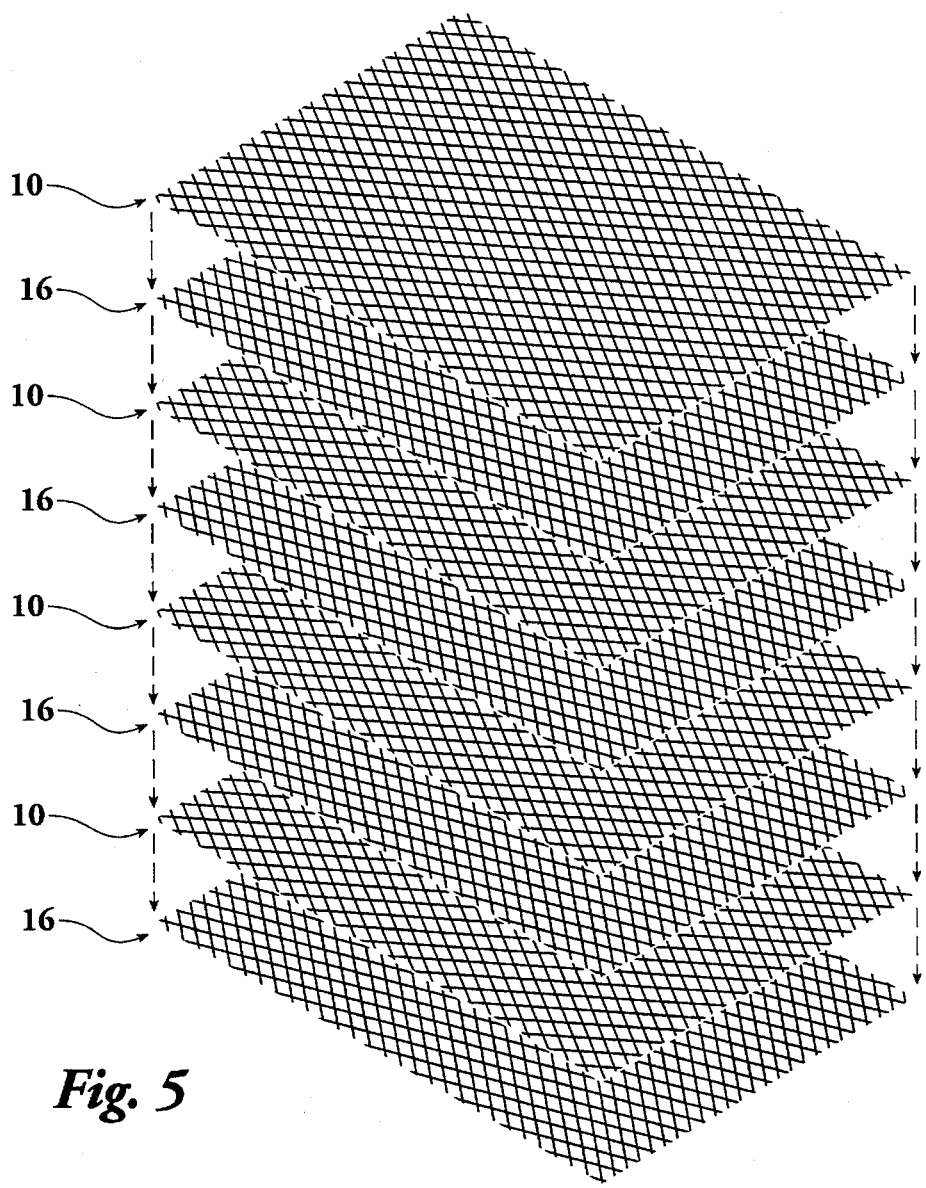
FIG. 5 is a diagrammatical illustration of stacking expanded metal foils to form an assembly. In the preferred arrangement the foils are stacked so that the flattened expanded metal foils have alternate positions in the stack. The stack is preferably formed
Figure 6:
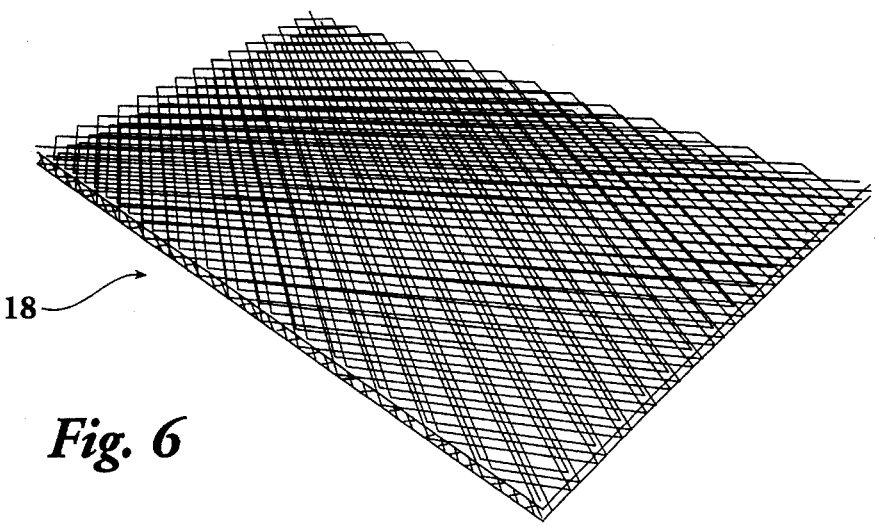
FIG. 6 is that the openings in each layer of foil are out of register with the openings in adjacent foil layers so that, in the stacked assembly, few, if any, direct passageways from one surface to the other of the finished mat exist.

To form a porous metal mat, successive layers of expanded metal foil are stacked together as depicted in FIG. 5. In the preferred arrangement, layers are alternated between expanded metal foil 10 and flattened expanded metal foil 16. However, it is not necessary that the assembly have an equal number of flattened and non-flattened layers of expanded foil since the assembly could be made by placing two or more layers of expanded foil adjacent each other followed by a single layer of flattened foil and the relationship repeated. However, there is advantage in stacking the layers alternately, as illustrated in FIG. 6, since this system provides a completed porous metal mat having small dimensioned interstices between the layers through which liquids or gases can pass and where liquids and/or gases can be subjected to electrolytic action.

After the layers of expanded metal foil and flattened expanded metal foil are stacked, as in FIG. 5, they are compressed together and bonded so as to form a semi-rigid electrically conductive mat. Bonding may be accomplished mechanically, that is, by stapling or riveting the stack together. Another means of bonding the layers of expanded metal foil together is by welding or brazing. A third, and a preferred embodiment, includes diffusion bonding the stacked layers together in which, in the usual manner of diffusion bonding, the stacked mat is placed in a furnace with a protective atmosphere and brought to a predetermined temperature under selected conditions that cause the layers of foil to diffusion bonded to each other while preserving the porosity of the stacked assembly.

In the process of stacking the layers of expanded metal foil and flattened expanded metal foil, it is highly desirable that the layers be stacked so that the openings 14 do not consistently align with each other. That is, the expanded metal foil layers should be stacked so that the openings 14 are out of alignment with adjacent layers so that the mat 18 when completed is substantially free of any openings that pass directly through the mat from one surface to the other.

The invention has been tested by producing a mat foil formed of titanium metal foil having a nominal thickness of about 0.004 inches. When titanium foil of this thickness is expanded, the resultant thickness "T", as shown in FIG. 2, is about 0.005 inches. When the expanded titanium foil is flattened the thickness "$T_1$", as shown in FIG. 4, is returned to about 0.004 inches, that is, substantially the thickness of the foil prior to expansion. Porous metal mats formed according to this invention can be made of any size, depending upon the size of sheets of porous metal foil employed in the process. The typical mats that are highly useful to function as electrodes in the chemical industry can be from 12 inches square up to 48 inches square. The thickness of the completed mat is directly related to the number of layers employed, and it can be from about 0.125 inches thick up to about 0.25 inches thick. These are by way of examples only and not by limitations it can be seen that the process of this invention makes it simple to control the thickness of the mat by the number of layers of expanded metal foil employed. If the layers are compressed prior to or during the bonding process the finished mat will have less thickness than if the layers are not compressed extensively during the bonding process.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of manufacture a porous metal mat comprising the steps of:

forming in overlapping relationship a stack of multiple layers of expanded electrically conductive metal foil to provide an assembly in which some of the layers are as expanded and some of the layers are flattened after expansion; and bonding the assembly of stacked layers to form a mat.

2. The method of claim 1 in which as expanded and flattened layers are alternated.

3. The method of claim 1 in which said layers are formed of expanded titanium metal foil.

4. The method of claim 1 in which said layers are of thickness of about 0.005 inches as expanded and of thickness of about 0.004 inches when flattened.

5. A method according to claim 1 in which said step of bonding the stacked layers is comprised of stapling, spot welding, riveting, brazing or diffusion bonding.

6. The method according to claim 4 in which said assembly as bonded is of thickness of about 0.125 inches to 0.25 inches.

7. A semi-rigid electrically conductive porous mat comprising:

a bonded stack formed of multiple layers of electrically conductive expanded metal foil in which some of the layers are as expanded and some are flattened.

8. A semi-rigid electrically conductive porous mat according to claim 7 wherein said as expanded and said flattened layers are alternated.

9. A semi-rigid electrically conductive porous mat according to claim 7 in which said layers are formed of expanded titanium foil.

10. A semi-rigid electrically conductive porous mat according to claim 7 in which each said expanded layer as expanded is about 0.005 inches thick and each said expanded layer as flattened is about 0.004 inches thick.

11. A semi-rigid electrically conductive porous mat according to claim 7 in which said stack is mechanically bonded.

12. A semi-rigid electrically conductive mat according to claim 7 in which said stack is bonded by brazing.

13. A semi-rigid electrically conductive mat according to claim 7 in which said stack is diffusion bonded.

14. A semi-rigid electrically conductive mat according to claim 10 in which said mat is of thickness of about 0.125 inches to 0.25 inches.

15. A method of manufacturing a porous titanium electrically conductive metal electrode comprising:

stacking multiple layers of expanded metal foil to form an assembly in which layers as expanded are alternated with layers of metal foil that are flattened prior to stacking; and bonding the assembly of stacked layers into an integral electrode forming mat.

16. A method of claim 15 in which the layers of expanded metal foil are each about 0.005 inches as expanded and about 0.004 inches as flattened.

17. The method of claim 15 in which said assembly is diffusion bonded.

18. The method according to claim 16 in which said assembly as bonded is of thickness of about 0.125 inches to 0.25 inches.

* * * * *